United States Patent
Kawasaki (10) Patent No.: US 9,939,283 B2
(45) Date of Patent: Apr. 10, 2018

(54) NAVIGATION SYSTEM AND IN-VEHICLE DEVICE

(71) Applicant: Alpine Electronics, Inc., Tokyo (JP)

(72) Inventor: Yasuhiro Kawasaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/077,551

(22) Filed: Mar. 22, 2016

(65) Prior Publication Data

US 2016/0298975 A1   Oct. 13, 2016

(30) Foreign Application Priority Data

Apr. 13, 2015 (JP) ................. 2015-081939

(51) Int. Cl.
*G01C 21/34* (2006.01)
*G01C 21/36* (2006.01)

(52) U.S. Cl.
CPC ................. *G01C 21/3605* (2013.01)

(58) Field of Classification Search
CPC ............ G01C 21/3461; G01C 21/3492; G01C 21/3632; G01C 21/3641; G01C 21/3602; G01C 21/34; G01C 21/32; G01C 21/20; G01C 21/26; G01C 21/16; G01C 21/28
USPC ....... 701/533, 409, 410, 420, 532, 425, 1, 2, 701/408, 411
See application file for complete search history.

(56) References Cited

U.S. PATENT DOCUMENTS

| | | | | |
|---|---|---|---|---|
| 6,748,321 B2* | 6/2004 | Watanabe | .......... | G01C 21/3688 340/990 |
| 7,552,009 B2* | 6/2009 | Nelson | ................ | G01C 21/362 701/36 |
| 7,603,230 B2* | 10/2009 | Suzuki | ............... | G01C 21/3629 340/995.12 |
| 7,646,296 B2* | 1/2010 | Ohki | .................... | G01C 21/362 340/539.13 |
| 8,102,281 B2* | 1/2012 | Ohki | .................... | G01C 21/362 340/995.19 |
| 8,134,481 B2* | 3/2012 | Ohki | .................... | G01C 21/362 340/995.19 |
| 8,463,544 B2 | 6/2013 | Katoh | | |
| 8,489,327 B2* | 7/2013 | Blackwood | ............ | G01C 21/26 340/995.12 |
| 8,775,067 B2* | 7/2014 | Cho | ........................ | G01C 21/36 345/173 |
| 9,092,308 B2 | 7/2015 | Suzuki et al. | | |
| 9,200,914 B2* | 12/2015 | Solomon | ............ | G01C 21/3492 |
| 9,250,097 B2* | 2/2016 | Bennett | ............. | G01C 21/3688 |

(Continued)

FOREIGN PATENT DOCUMENTS

| | | |
|---|---|---|
| JP | 2005-134209 | 5/2005 |
| JP | 2008-139252 | 6/2008 |
| JP | 2013-119263 | 6/2013 |

*Primary Examiner* — Jelani A Smith
*Assistant Examiner* — Luis A Martinez Borrero
(74) *Attorney, Agent, or Firm* — Brinks Gilson & Lione (57) ABSTRACT

When an instruction to start a setting operation for a destination is provided by a user during a period in which a navigation server is not available for a mobile device while a navigation function, which uses the navigation server providing distribution function of map data and route search function, of the mobile device is being utilized in a navigation device, the navigation function provided in the navigation device itself is activated and is caused to perform destination setting operation.

12 Claims, 6 Drawing Sheets

(56) References Cited

U.S. PATENT DOCUMENTS

| | | | |
|---|---|---|---|
| 9,283,931 B2* | 3/2016 | Skelton | B60R 25/00 |
| 2003/0065440 A1* | 4/2003 | Oda | G01C 21/26 |
| | | | 701/537 |
| 2003/0069686 A1* | 4/2003 | Watanabe | G01C 21/20 |
| | | | 701/409 |
| 2003/0074135 A1* | 4/2003 | Watanabe | G01C 21/3688 |
| | | | 701/418 |
| 2006/0190170 A1* | 8/2006 | Piekarz | G01C 21/265 |
| | | | 701/431 |
| 2008/0114541 A1* | 5/2008 | Shintani | G01C 21/362 |
| | | | 701/420 |
| 2008/0177461 A1* | 7/2008 | Blackwood | G01C 21/26 |
| | | | 701/532 |
| 2010/0082231 A1* | 4/2010 | Chang | G01C 21/36 |
| | | | 701/533 |
| 2010/0169010 A1* | 7/2010 | Jeong | G01C 21/3647 |
| | | | 701/533 |
| 2011/0018759 A1* | 1/2011 | Bennett | G01C 21/3688 |
| | | | 342/357.4 |
| 2011/0213550 A1* | 9/2011 | Ishizuka | G01C 21/30 |
| | | | 701/533 |
| 2012/0046808 A1* | 2/2012 | Furuta | G01C 21/362 |
| | | | 701/2 |
| 2012/0316777 A1* | 12/2012 | Kitta | G01C 21/3661 |
| | | | 701/431 |
| 2014/0163870 A1* | 6/2014 | Riley | G01C 21/00 |
| | | | 701/470 |
| 2015/0094949 A1* | 4/2015 | Kato | G01C 21/3688 |
| | | | 701/410 |
| 2016/0231125 A1* | 8/2016 | Moshfeghi | G01C 21/3608 |

\* cited by examiner

NAVIGATION SYSTEM AND IN-VEHICLE DEVICE

RELATED APPLICATIONS

The present application claims priority to Japanese Patent Application Serial Number 2015-081939, filed Apr. 13, 2015, the entirety of which is hereby incorporated by reference.

BACKGROUND

1. Field of the Invention

The present disclosure relates to a technique for performing route guidance in an in-vehicle device mounted in an automobile.

2. Description of the Related Art

As a technology for performing a route guidance, a navigation device is known that provides a navigation function including receiving setting of a destination from a user, searching for a route to the destination using pre-stored map data, and displaying a navigation screen showing the route on a map represented by the map data (for instance, Japanese Unexamined Patent Application Publication No. 2008-139252).

In addition, as a technology for performing a route guidance, a mobile device is also known that provides a navigation client function that includes receiving a setting of a destination from a user, connecting to a server system via mobile communication, requesting the server system to search for a route to the destination, requesting the data of the map of surrounding area of the current position from the server system, thereby obtaining the route to the destination and the map data, and displaying a route guidance screen showing the route on a map represented by the obtained data (for instance, Japanese Unexamined Patent Application Publication No. 2005-134209).

Also, in an in-vehicle device mounted in an automobile, another technology is known that displays an image transferred from a mobile device connected to the in-vehicle device, on a display device of the in-vehicle device, and that controls the operation of the mobile device according to an operation received via an input device of the in-vehicle device (for instance, Japanese Unexamined Patent Application Publication No. 2013-119263).

SUMMARY

In a navigation device equipped with a navigation function as described above, a configuration may be adopted in which for a user interface such as a display output, reception of an operation input of the mobile device is provided as a substitute, and thus the navigation client function of the mobile device is made available from the navigation device. In other words, when an operation of setting a destination as a navigation client function is received by using an input device of the navigation device, or a route guidance screen generated by the navigation client function is displayed on a display device of the navigation device, the navigation client function of the mobile device is made available from the navigation device.

In addition, on the precondition that such a navigation client function of the mobile device is made available from the navigation device, in the navigation device, a configuration may be adopted that allows a user to selectively use a first mode in which the navigation function of the navigation device itself is utilized, and a second mode in which the navigation client function of the mobile device is utilized from the navigation device.

However, in the navigation device that allows selective use of the first mode and the second mode, it is assumed that a situation may occur where the mobile device is unable to communicate with the server system due to deterioration of communication environment during a period in which the navigation client function of the mobile device is utilized from the navigation device in the second mode.

When a user attempts to set a new route by designating a new destination using the navigation client function during such a period when the mobile device is unable to communicate with the server system, setting of a route results in a failure because the mobile device is unable to communicate with the server system. In this case, in order to set a route to a new destination and receive a route guidance from the navigation device, it is necessary for a user to perform complicated operations: switching the mode of the navigation device to the first mode in which the navigation function is utilized, and again setting a destination using the navigation function of the navigation device.

Also, depending on the navigation client function of the mobile device, previously set route may be cleared due to the setting of a destination, and in such a case, even if the first mode is maintained after a failure of route setting, a user is unable to receive even a route guidance of the original route.

Thus, according to forms of the present disclosure, in a navigation device in which the navigation client function of connected mobile device and the navigation function provided in the in-vehicle device are available for a user, a simplified operation of setting a new route is provided during a period in which a server system necessary for execution of the navigation client function is not connectable.

In order to achieve the above-mentioned simplification, forms of the present disclosure provide a navigation system including: an in-vehicle device mounted in an automobile; a mobile device connectable to the in-vehicle device; and a navigation server that transmits map data and a route to a destination requested from the mobile device to the mobile device via wireless communication, wherein the in-vehicle device includes a display device, an input device, a map data storage that stores map data, a current position calculation unit that calculates a current position of the automobile, a navigation unit that performs a destination setting operation to receive setting of a destination from a user via the input device when a first mode is set as an operation mode of the in-vehicle device, a guidance route setting operation to set a guidance route to be a route to the destination received in the destination setting operation, and a navigation screen display operation to display a navigation screen on the display device, the navigation screen showing the current position of the automobile and the guidance route on a map represented by the map data stored in the map data storage, and a navigation switcher, the mobile device includes a current position calculation unit that calculates a current position of the mobile device, a navigation client unit performs a destination reception operation to receive setting of a destination from a user via the input device of the in-vehicle device when a second mode is set as the operation mode in a state in which the mobile device is connected to the in-vehicle device, a guidance route acquisition operation to request a route to the destination received in the destination reception operation from the navigation server system, and thereby to obtain the route from the navigation server system to set a guidance route, and a route guidance screen display operation to obtain map data from the navigation server system, to transfer a route guidance screen to the in-vehicle device, which is caused to display the route guidance screen on the display device, the route guidance screen showing the current position of the mobile device and the guidance route on a map represented by the obtained map data, and a state detector that detects a state indicating whether or not the navigation client unit is connectable to the navigation server. When the first mode is set as the operation mode in a state in which the mobile device is connected to the in-vehicle device and an instruction to start a setting operation for a destination is provided by a user, the navigation switcher causes the navigation unit of the in-vehicle device to perform the destination setting operation, when the second mode is set as the operation mode in a state in which the mobile device is connected to the in-vehicle device and an instruction to start the setting operation for a destination is provided by a user, in the case where a state detected by the state detector of the mobile device indicates that the navigation client unit is connectable to the navigation server, the navigation switcher causes the navigation client unit of the mobile device to perform the destination reception operation, and when the second mode is set as the operation mode in a state in which the mobile device is connected to the in-vehicle device and an instruction to start the setting operation for a destination is provided by a user, in the case where a state detected by the state detector of the mobile device indicates that the navigation client unit is not connectable to the navigation server, the navigation switcher performs a navigation switching operation to switch the operation mode to the first mode and to cause the navigation unit of the in-vehicle device to perform the destination setting operation.

The navigation system described above may have a configuration in which after the navigation switching operation is performed, when the state detected by the state detector of the mobile device changes to a state indicating that the navigation client unit is connectable to the navigation server, the navigation switcher may set the destination set in the navigation unit to a destination of the navigation client unit, and may change the operation mode back to the second mode.

The navigation system described above may have a configuration in which as the operation mode, the in-vehicle device has one or more modes different from the first mode and the second mode, when neither the first mode nor the second mode is set as the operation mode in a state in which the mobile device is connected to the in-vehicle device and an instruction to start a setting operation for a destination is provided by a user, in the case where an operation mode set most recently out of the first mode and the second mode is the first mode, the navigation switcher switches the operation mode to the first mode, and causes the navigation unit of the in-vehicle device to perform the destination setting operation, when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the state detected by the state detector of the mobile device indicates that the navigation client unit is connectable to the navigation server, the navigation switcher switches the operation mode to the second mode, and causes the navigation client unit of the mobile device to perform the destination reception operation, and when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the state detected by the state detector of the mobile device indicates that the navigation client unit is not connectable to the navigation server, the navigation switcher switches the operation mode to the first mode, and causes the navigation unit of the in-vehicle device to perform the destination setting operation.

In the navigation system described above, as the state indicating whether or not the navigation client unit is connectable to the navigation server, a state indicating whether or not the mobile device is capable of the wireless communication may be used. It is to be noted that in this case, the state in which the mobile device is capable of the wireless communication indicates that the navigation client unit is connectable to the navigation server, and the state in which the mobile device is not capable of the wireless communication indicates that the navigation client unit is not connectable to the navigation server.

The navigation system described above is mobile communication that is performed via the mobile communication network, and as the state indicating whether or not the navigation client unit is connectable to the navigation server, a state indicating whether the mobile device is located within a communication range of the mobile communication network may be used. It is to be noted that in this case, the state in which the mobile device is located within the communication range of the mobile communication network indicates that the navigation client unit is connectable to the navigation server, and the state in which the mobile device is located out of the communication range of the mobile communication network indicates that the navigation client unit is not connectable to the navigation server.

In the navigation system described above, as the state indicating whether or not the navigation client unit is connectable to the navigation server, a state indicating whether the navigation client unit of the mobile device and the navigation server are in online state or offline state may be used. It is to be noted that in this case, the state in which the navigation client unit of the mobile device and the navigation server are in online state indicates that the navigation client unit is connectable to the navigation server, and the state in which the navigation client unit of the mobile device and the navigation server are in offline state indicates that the navigation client unit is not connectable to the navigation server.

With the navigation system described above, when an instruction to start the setting operation for a destination is provided by a user, if the navigation server system is not available for the mobile device, even when the navigation function, which is currently-utilized or has been utilized by a user, is the navigation function of the navigation client unit of the mobile device, the navigation function to be utilized by a user is switched to the navigation function of the navigation unit of the in-vehicle device and the navigation unit of the in-vehicle device is caused to execute the destination setting operation.

Thus, according to forms of the present navigation system, when the navigation server system is not available for the mobile device, complicated operations such as the following are unnecessary: a user performs an operation to start the destination reception operation on the navigation client unit of the mobile device, then the user is informed of a failure in acquisition of setting of a destination or a guidance route to the destination from the navigation server system due to unavailability of the navigation server system, and the user sets the operation mode to the first mode, and causes the navigation unit of the in-vehicle device to execute the destination setting operation.

As described above, according to forms of the present disclosure, in a navigation device in which the navigation client function of connected mobile device and the navigation function provided in the in-vehicle device are available for a user, an operation of setting a new route may be simplified during a period in which a server system necessary for execution of the navigation client function is not connectable.

DETAILED DESCRIPTION OF THE DRAWINGS

Figure 1:
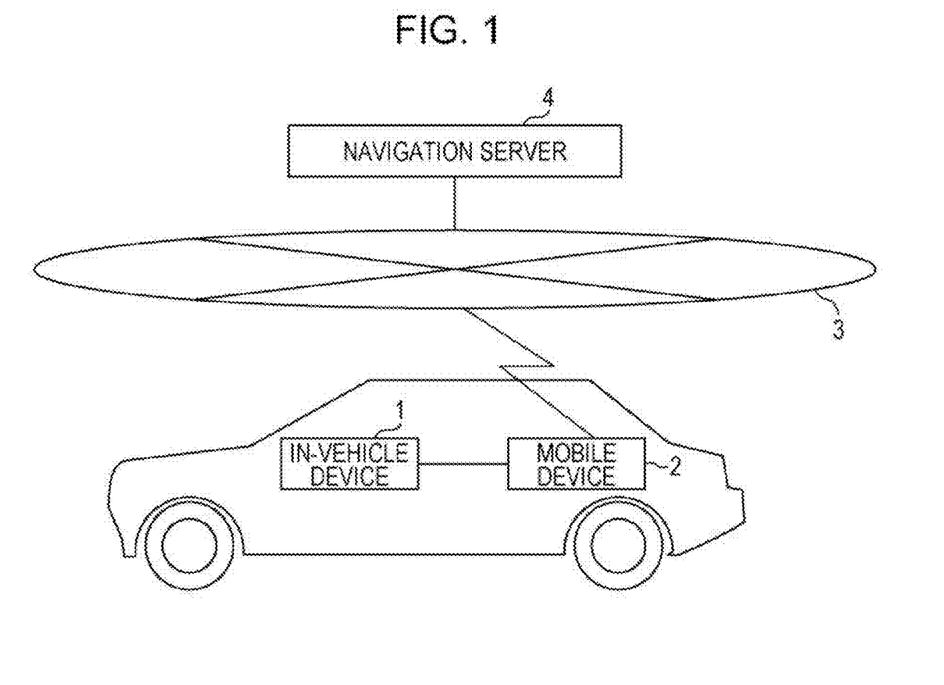
FIG. 1 is a block diagram illustrating a configuration of a navigation system.

Hereinafter, a form of the present disclosure will be described. FIG. 1 illustrates a configuration of a navigation system. As illustrated, the navigation system includes an in-vehicle device 1 mounted in an automobile, a mobile device 2 connected to the in-vehicle device 1 via local wireless communication such as Bluetooth (registered trademark) or Wi-Fi or wired communication such as USB or HDMI (registered trademark), and a navigation server 4 accessible by the mobile device 2 via WAN 3 such as a mobile communication network or the Internet. It is to be noted that the mobile device 2 is a device carried by a user, such as a tablet or a mobile phone.

Figure 2:
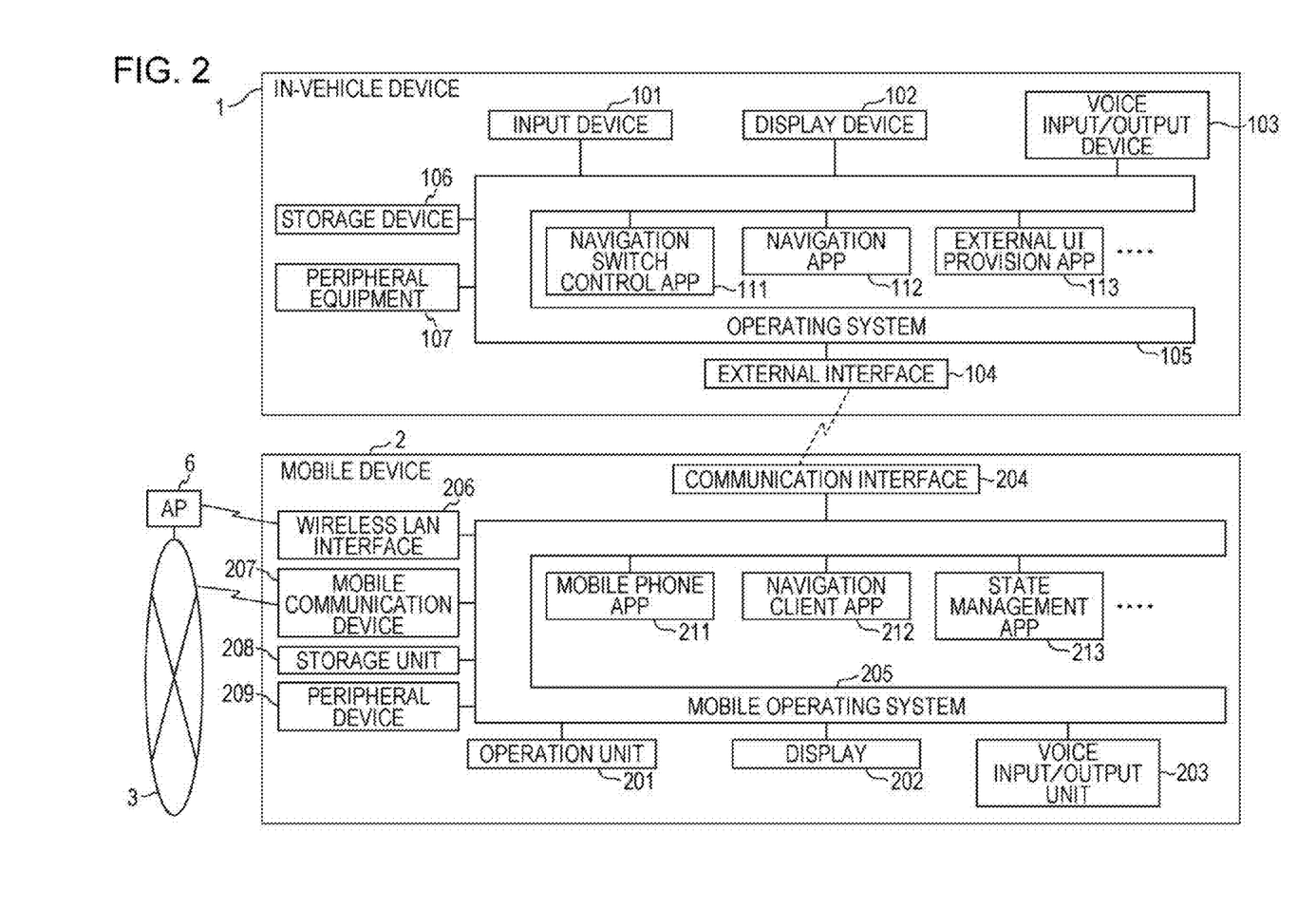
FIG. 2 is a block diagram illustrating a configuration of an in-vehicle device and a mobile device.

Next, the configurations of the in-vehicle device 1 and the mobile device 2 are illustrated in FIG. 2. As illustrated, the in-vehicle device 1 includes input devices 101 such as a touch panel, a hardware key or a voice input device, a display device 102, a voice input/output device 103 equipped with a microphone, a speaker or the like, an external interface 104 that is an interface for wireless communication or wired communication, an operating system 105 for the in-vehicle device 1, application that runs on the operating system 105, a storage device 106 in which map data is stored, and other peripheral devices 107 such as a GPS receiver or a sensor that detects various states of the automobile.

In addition, as the above-mentioned application, the in-vehicle device 1 includes navigation switching control APP 111, navigation APP 112, an external UI provision APP 113, and other applications.

However, as the hardware, the in-vehicle device 1 is constructed using a computer including a CPU and a memory, and the operating system 105 and each application are implemented by executing predetermined computer programs by the computer.

Next, the mobile device 2 includes an operation unit 201, a display 202, a voice input/output unit 203 having a microphone or a speaker, a communication interface 204 that is an interface for wireless communication or wired communication, a mobile operating system 205 that is an operating system for the mobile device 2, a wireless LAN interface 206 to be connected to a mobile application which is an application that runs on the mobile operating system 205, and to an access point 6 (AP6) of a wireless LAN, a mobile communication device 207 for accessing to a mobile phone network, a storage unit 208, and other peripheral device 209.

Here, as a mobile application, the mobile device 2 has a mobile phone APP 211, a navigation client APP 212, and a state management APP 213, the mobile phone APP 211 providing functions of mobile phone using the mobile communication device 207, the voice input/output unit 203, and the operation unit 201, It is to be noted that as the hardware, the mobile device 2 is formed with a computer including a CPU, a memory, and the mobile operating system 205 and each mobile application are achieved by executing predetermined computer programs by the computer.

Now, in the configuration described above, the mobile device 2 and the in-vehicle device 1 are connectable via the external interface 104 and the communication interface 204, and the mobile application of the mobile device 2 and the application of the in-vehicle device 1 are able to communicate with each other by utilizing the functions of the mobile operating system 205 and the operating system 105.

Hereinafter, the operation of this navigation system will be described. In response to a user's operation, the operating system 105 of the in-vehicle device 1 allows one application to run in the foreground and other started applications to run in the background. Also the navigation APP 112 of the in-vehicle device 1 constantly runs, and the running state is switched between the foreground and background by the control of the operating system 105.

Next, the navigation APP 112 of the in-vehicle device 1 calculates the current position of the automobile using a GPS receiver and a sensor equipped in the in-vehicle device 1 as the peripheral devices 107 and map data stored in the storage device 106. The navigation APP 112 of the in-vehicle device 1 also receives setting of a destination from a user, and searches for a route to the destination and defines the route as a guidance route using the map data stored in the storage device 106 in accordance with predetermined search conditions.

Figure 3A:
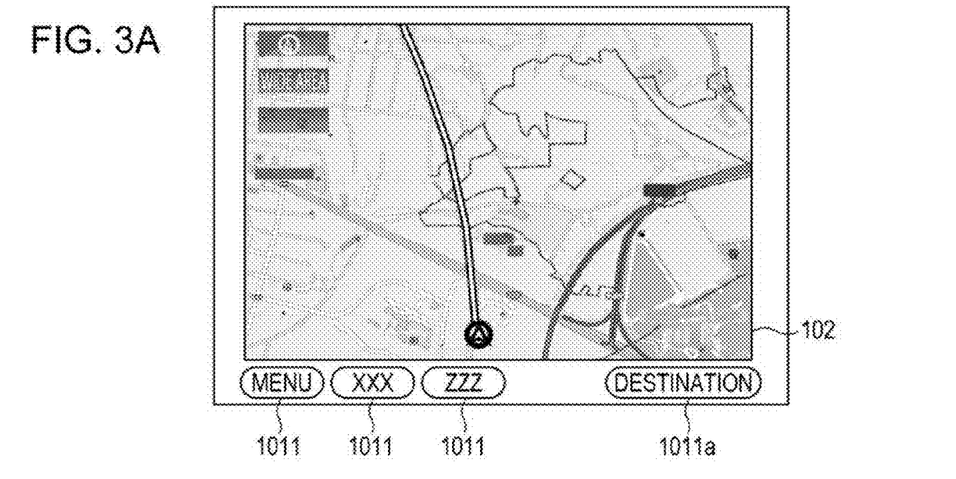
FIGS. 3A to 3C each illustrate an example of display of the in-vehicle device and the mobile device.

In addition, the navigation APP 112 of the in-vehicle device 1 has a function of generating output screens and displaying them on the display device 102 when the navigation APP 112 is running as an application in the foreground of the in-vehicle device 1, the output screens including, for instance, a destination setting menu screen for receiving setting of a destination from a user, and a navigation screen that displays a current position mark indicating the current position and a defined guidance route on the map as illustrated in FIG. 3A, represented by the map data stored in the storage device 106. It is to be noted that when a guidance route is not defined, the guidance route is not included in the navigation screen.

As illustrated in FIG. 3A, a plurality of hardware keys 1011, which is part of the input devices 101 of the in-vehicle device 1, is arranged under the display surface of the display device 102 of the in-vehicle device 1. One of the plurality of hardware keys 1011 is a "destination" key 1011a for receiving an instruction to start setting operation for a destination of the in-vehicle device 1.

Next, in response to a user's operation, the mobile operating system 205 of the mobile device 2 allows one mobile application to run in the foreground and other started mobile applications to run in the background.

In addition, the navigation client APP 212 of the mobile device 2 has functions of calculating a current position of the mobile device 2 and receiving setting of a destination from a user by using a GPS receiver that serves as the peripheral device 209 in the mobile device 2. The navigation client APP 212 also performs an operation of accessing the navigation server 4 on the WAN 3 via the mobile communication device 207 or the wireless LAN interface 206, and obtaining from the navigation server 4 the data of a guidance route which is a route to a destination set by a user and data of the map of surrounding area of the current position.

The navigation server 4 has functions of, upon receiving a request for guidance route from the navigation client APP 212 via the WAN 3, searching for a route from the current position to the destination designated by the request for guidance route and transmitting data of the searched route to the navigation client APP 212 as the data of the guidance route. The navigation server 4 also has a function of, upon receiving a request for map data from the navigation client APP 212 via the WAN 3, transmitting data of the map of surrounding area of the designated location requested in the request for map data to the navigation client APP 212.

The navigation client APP 212 of the mobile device 2, when receiving the setting of a destination from a user, issues a guidance route request, which designates the current position and a destination, to the navigation server 4, and obtains guidance route data which is transmitted as a response to the guidance route request from the navigation server 4.

In addition, when the current position is moved to the vicinity of a position for which data of the map of surrounding area is not stored in the storage unit 208 of the mobile device 2, the navigation client APP 212 of the mobile device 2 issues a map data request with designated point of the current position to the navigation server 4, obtains data of the map of surrounding area of the current position, the data being transmitted as a response to the map data request from the navigation server 4, and stores the data in the storage unit 208 of the mobile device 2.

Figure 3B:
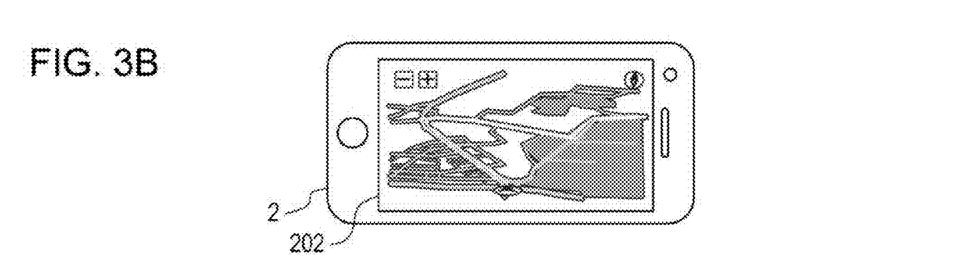

Furthermore, the navigation client APP 212 of the mobile device 2 has a function of generating output screens and displaying them on the display 202 of the mobile device 2 when the mobile device 2 is not connected to the in-vehicle device 1 and the navigation client APP 212 is running as an APP in the foreground of the mobile device 2, the output screens including a destination setting reception screen for receiving setting of a destination, and a route guidance screen that displays a current position mark indicating the current position of the mobile device 2, and a guidance route for which data is obtained from the navigation server 4, on the map of surrounding area of the current position as illustrated in FIG. 3B, for which data is obtained from the navigation server 4.

In addition, the navigation client APP 212 of the mobile device 2 has voice guidance mode and unvoiced guidance mode as guidance modes. When the voice guidance mode is set as the guidance mode, guidance of the route, for which data is obtained from the navigation server 4, is provided by voice. In other words, when the mobile device 2 is not connected to the in-vehicle device 1 and the voice guidance mode is set as the guidance mode, the navigation client APP 212 of the mobile device 2 generates output voice and outputs the voice from the voice input/output unit 203, the output voice for guiding an intersection to make a right/left turn and a turning direction at the intersection according to the guidance route.

Here, the mobile operating system 205 of the mobile device 2 has external I/O mode as an operation mode which may be set when the mobile device 2 is connected to the in-vehicle device 1. When the external I/O mode is set by the in-vehicle device 1, the mobile operating system 205 performs an operation of controlling the operation of each mobile application of the mobile device 2 according to the control from the in-vehicle device 1, and an operation of transferring an output screen and output voice generated by each mobile application to the in-vehicle device 1 without outputting the output screen and voice to the display 202 and the voice input/output unit 203.

The external UI provision APP 113 of the in-vehicle device 1 is an application that provides user interface (UI) for the mobile device 2 connected, using the display device 102, the input device 101, and the voice I/O device 103 of the in-vehicle device 1.

Figure 3C:
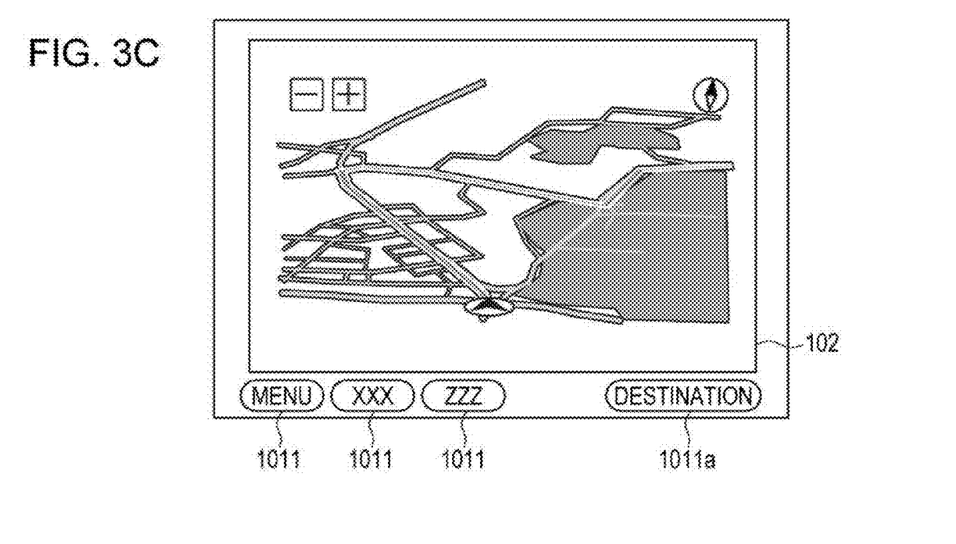

The external UI provision APP 113 of the in-vehicle device 1, when starting the operation as the application in the foreground of the in-vehicle device 1, sets the mobile device 2 connected to the in-vehicle device 1 to the external I/O mode. In addition, when the external UI provision APP 113 is instructed from a user to provide a user interface of the navigation client APP 212 of the mobile device 2 while running as the application in the foreground, the external UI provision APP 113 starts to provide the UI of the navigation client APP 212 of the mobile device 2. Specifically, when the navigation client APP 212 of the mobile device 2 is not executed in the mobile device 2, the navigation client APP 212 is started on the mobile operating system 205 of the mobile device 2 and the operation of the navigation client APP 212 of the mobile device 2 is controlled according to an operation performed using the input device 101 of the in-vehicle device 1 in such a manner that an output screen such as the route guidance screen and output voice such as the voice in voice guidance of the navigation client APP 212 of the mobile device 2 are transferred to the in-vehicle device 1, the transferred screen is displayed on the display device 102 of the in-vehicle device 1 as illustrated in FIG. 3C, and the transferred voice is outputted from the voice I/O device 103. It is to be noted that FIG. 3C illustrates the manner in which a route guidance screen of the navigation client APP 212, transferred from the mobile device 2 is displayed on the display device 102 of the in-vehicle device 1.

Next, when the mobile device 2 is connected to the in-vehicle device 1, in response to a request from the navigation switching control APP 111 of the in-vehicle device 1, the state management APP 213 of the mobile device 2 performs an operation of transmitting various states of the mobile device 2 to the navigation switching control APP 111 of the in-vehicle device 1. Here, the state management APP 213 of the mobile device 2 notifies the navigation switching control APP 111 of a state of the mobile device 2 such as a state in which the mobile communication device 207 is located within a communication range of mobile communication or not (mobile communication is possible or not), or a state in which the wireless LAN interface 206 is connected to the WAN 3 via the access point 6 or not.

Figure 4:
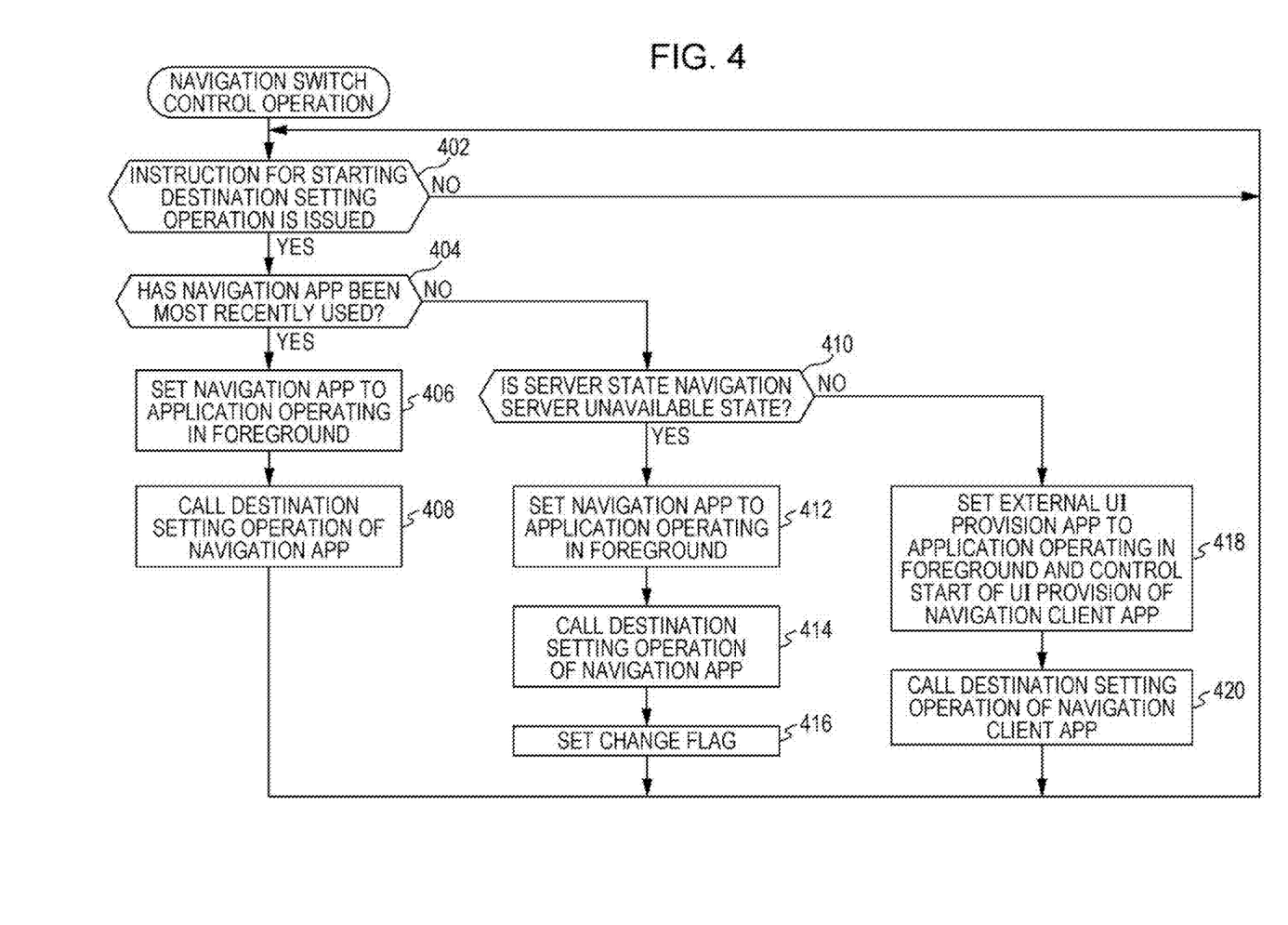
FIG. 4 is a flow chart illustrating a navigation switching control operation.
Figure 5:
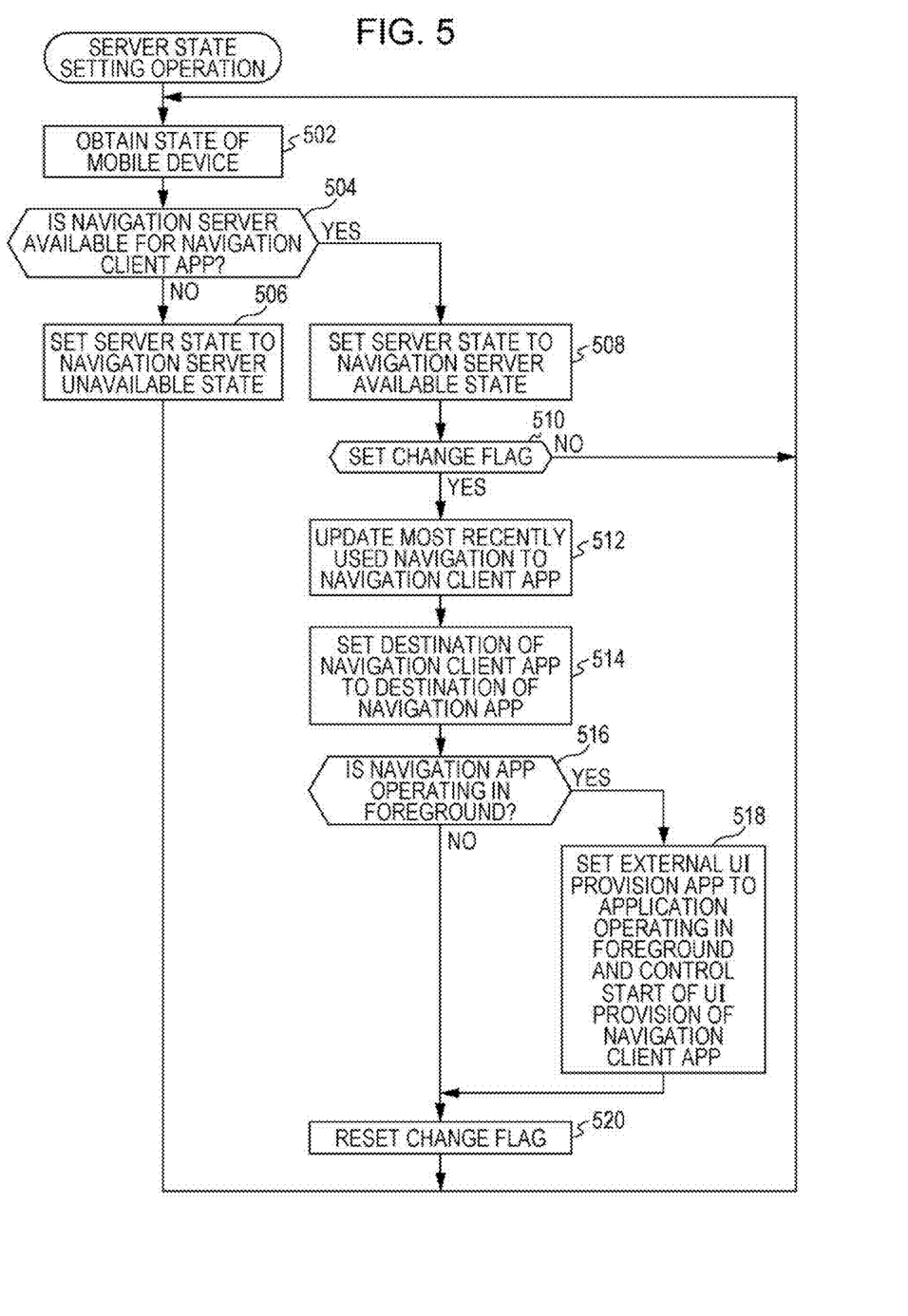
FIG. 5 is a flow chart illustrating a server state setting operation.

In such a configuration of the navigation system, the navigation switching control APP 111 of the in-vehicle device 1 performs the navigation switching control operation illustrated in the steps of FIG. 4 and the server state setting operation illustrated in the steps of FIG. 5.

First, the navigation switching control operation performed by the navigation switching control APP 111 of the in-vehicle device 1 will be described. As illustrated in FIG. 4, in the navigation switching control operation, the navigation switching control APP 111 of the in-vehicle device 1 monitors an occurrence of an instruction from a user to start a setting operation for a destination (step 402). Here, the instruction to start the setting operation for a destination is received from a user by the depression of "destination" key 1011*a* provided as one of the hardware keys 1011 as described above. However, the instruction to start the setting operation for a destination may be received by a software key included in the output screen for any application or mobile application or by predetermined voice input. For instance, the instruction to start the setting operation for a destination may be received by a software key included in the output screen for the navigation APP 112 or the navigation client APP 212 of the in-vehicle device 1.

When an instruction to start the setting operation for a destination is provided by a user (step 402), it is determined whether the currently-used navigation is the navigation APP 112 of the in-vehicle device 1 or the navigation client APP 212 of the mobile device 2 (step 404). Here, the currently-used navigation indicates the application that is one of the navigation APP 112 of the in-vehicle device 1 and the navigation client APP 212 of the mobile device 2, and that is used most recently by a user. The navigation switching control APP 111 of the in-vehicle device 1 updates the currently-used navigation to the navigation APP 112 when the navigation APP 112 of the in-vehicle device 1 starts its operation in the foreground, and updates the currently-used navigation to the navigation client APP 212 when the external UI provision APP 113 runs in the foreground to start provision of the UI of the navigation client APP 212 of the mobile device 2.

When the currently-used navigation is the navigation APP 112 of the in-vehicle device 1 (step 404), the application running in the foreground, if not the navigation APP 112, is switched to the navigation APP 112 (step 406), and the destination setting operation of the navigation APP 112 is called (step 408). The flow then returns to the operation from step 402.

Figure 6A:
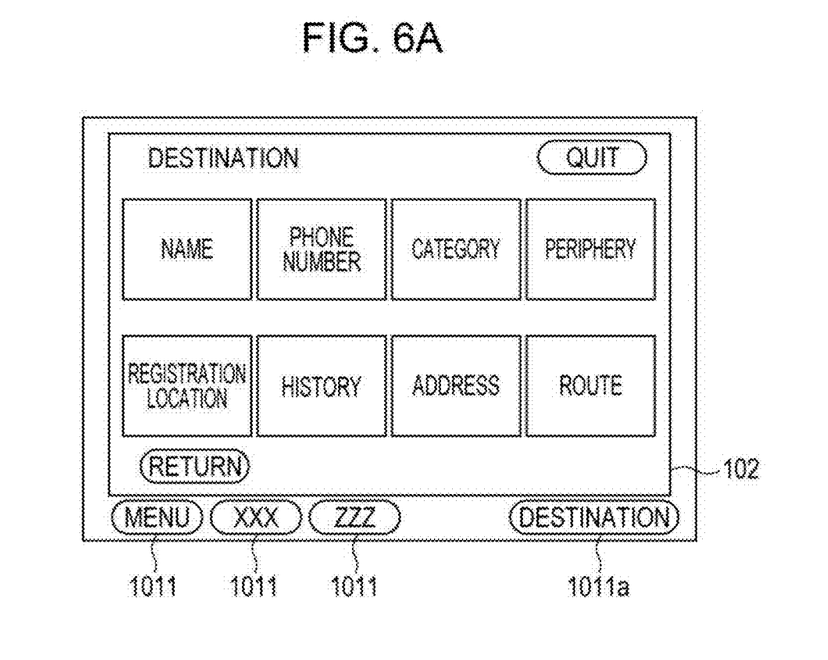
FIGS. 6A and 6B each illustrate an example of display of the in-vehicle device and the mobile device.

Here, the navigation APP 112 whose destination setting operation is called displays, for instance, a destination setting menu screen as illustrated in FIG. 6A to receive setting of a destination, sets a guidance route to the set destination, and starts to display on the display device 102 a navigation screen showing a current position mark indicating the current position and a guidance route on the map as illustrated in FIG. 3A. The destination setting menu screen illustrated in FIG. 6A is a screen that receives a selection from a user of a category, by which search for the point set as the destination is made, the category being one of the name, phone number, and genre of the destination. When a user selects a category on the destination setting menu screen, it is possible to search for a point for destination and to set the point as the destination using the value of the selected category of the point for destination as a search key.

On the other hand, when it is determined that the currently-used navigation is not the navigation APP 112 but the navigation client APP 212 of the mobile device 2, it is checked whether the server state is a state in which the navigation server is unavailable (step 410). As described in detail later, the server state is set to either navigation server unavailable state in which the navigation server 4 is not available for the navigation client APP 212 of the mobile device 2 due to the server state setting operation or navigation server available state in which the navigation server 4 is available for the navigation client APP 212 of the mobile device 2.

When the server state is the navigation server unavailable state (step 410), the application running in the foreground, if not the navigation APP 112, is switched to the navigation APP 112 (step 412), and the destination setting operation of the navigation APP 112 is called (step 414). The flag is set (step 416) and the flow returns to the operation from step 402.

On the other hand, when it is determined that the server state is not the navigation server unavailable state but the navigation server available state in step 410, the application running in the foreground, if not the external UI provision APP 113, is switched to the external UI provision APP 113, which is started to provide the UI of the navigation client APP 212 of the mobile device 2 (step 418). The destination setting operation of the navigation client APP 212 of the mobile device 2 is called (step 420) and the flow returns to the operation from step 402.

Figure 6B:
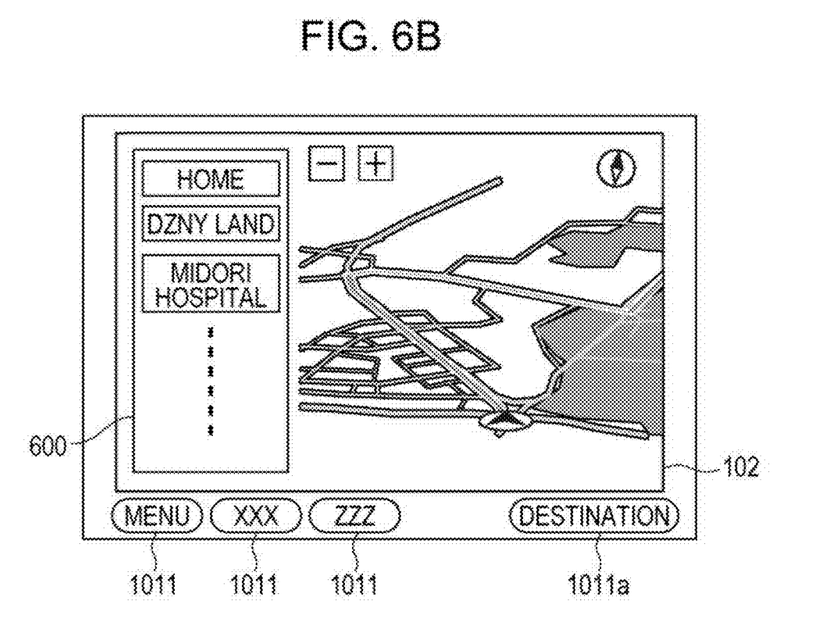

Here, the navigation APP 112 of the mobile device 2, whose destination setting operation is called, transfers output screens including, for instance, destination setting reception screen 600 as illustrated in FIG. 6B to the in-vehicle device 1, displays the output screens on the display device 102 of the in-vehicle device 1 by the external UI provision APP 113, receives setting of a destination from a user by the input device 101 of the in-vehicle device 1 via the external UI provision APP 113, obtains the data of a guidance route to the set destination from the navigation server 4, transfers a route guidance screen as an output screen to the in-vehicle device 1, the route guidance screen displaying the current position and the guidance route on the map whose data is obtained from the navigation server 4, and displays the output screen on the display device 102 of the in-vehicle device 1 via the external UI provision APP 113.

It is to be noted that the example illustrated in FIG. 6B is such that the output screen contains the destination setting reception screen 600 including a destination candidate list, and the route guidance screen illustrated in FIG. 3C. A user may select a destination candidate from the destination candidate list of the destination setting reception screen 600, and is able to set the selected destination candidate to a destination.

The navigation switching control operation performed by the navigation switching control APP 111 of the in-vehicle device 1 has been described in the above. Next, the server state setting operation performed by the navigation switching control APP 111 of the in-vehicle device 1 will be described. As illustrated in FIG. 5, in the server state setting operation, the navigation switching control APP 111 of the in-vehicle device 1 obtains various states of the mobile device 2 from the state management APP 213 of the mobile device 2 (step 502).

It is determined whether the navigation server 4 is available for the mobile device 2 at the current moment, based on the state of the mobile device 2 obtained from the state management APP 213 of the mobile device 2 (step 504), and if the navigation server 4 is not available, the above-described server state is set to the navigation server unavailable state (step 506), then the flow returns to the operation from step 502.

Here in step 502, in the case where the state of the mobile device 2 obtained from the state management APP 213 of the mobile device 2 indicates a state in which the mobile device 2 is not located within a communication range of mobile communication and the wireless LAN interface 206 of the mobile device 2 is not connected to the WAN3 via the access point 6, it is determined that the navigation server 4 is not available for the mobile device 2. In other cases, it is determined that the mobile device 2 is in a state in which the navigation server 4 is available.

However, whether the mobile device 2 is in a state in which the navigation server 4 is available may be determined such that when the navigation client APP 212 of the mobile device 2 is connected to the navigation server 4, it is determined that the mobile device 2 is in a state in which the navigation server 4 is available, and when the navigation client APP 212 is not connected to the navigation server 4, it is determined that the mobile device 2 is in a state in which the navigation server 4 is not available.

However, in this case, the state management APP 213 of the mobile device 2 includes online/offline state of connection of the navigation client APP 212 to the navigation server 4, in the state of the mobile device 2 transmitted to the navigation switching control APP 111 of the in-vehicle device 1. In the navigation switching control APP 111 of the in-vehicle device 1, when the state obtained from the state management APP 213 of the mobile device 2 indicates online state of the navigation client APP 212, it is determined that the mobile device 2 is in a state in which the navigation server 4 is available, whereas when the state indicates offline state of the navigation client APP 212, it is determined that the mobile device 2 is in a state in which the navigation server 4 is not available.

On the other hand, in step 504, when it is determined that the mobile device 2 is in a state in which the navigation server 4 is available, the server state is set to the navigation server available state (step 508).

It is then checked whether or not the above-mentioned change flag has been set (step 510), and when the change flag has not been set, the flow returns to the operation from step 502. On the other hand, when the change flag has been set (step 510), the above-described currently-used navigation is updated to the navigation client APP 212 (step 512). The destination set in the navigation APP 112 is obtained, and the obtained destination is set to the destination of the navigation client APP 212 by the state management APP 213 (step 514). The navigation client APP 212 with the set destination obtains the data of a guidance route to the set destination from the navigation server 4, and starts to generate an output screen of the route guidance screen that displays the current position and the guidance route on the map whose data is obtained from the navigation server 4.

It is then checked whether the navigation APP 112 of the in-vehicle device 1 is running in the foreground (step 516), and when the navigation APP 112 is not running in the foreground, the change flag is reset (step 520), and the flow returns to the operation from step 502.

On the other hand, when the navigation APP 112 is running in the foreground (step 516), the application running in the foreground is switched to the external UI provision APP 113, which is started to provide the UI of the navigation client APP 212 of the mobile device 2 (step 518), the change flag is reset (step 520), and the flow returns to the operation from step 502.

Here in step 518, when the external UI provision APP 113 starts to provide the UI of the navigation client APP 212 of the mobile device 2, the display of the display device 102 of the in-vehicle device 1 is switched to the route guidance screen that is generated as the output screen by the navigation client APP 212 of the mobile device 2.

The server state setting operation performed by the navigation switching control APP 111 of the in-vehicle device 1 has been described in the above. Are described above, in forms of the present disclosure, when an instruction to start the setting operation for a destination is provided by a user, if the navigation server 4 is not available for the navigation client APP 212 of the mobile device 2, even when the navigation function, which is currently-utilized or has been utilized by a user, is the navigation function of the navigation client APP 212 of the mobile device 2, the navigation APP 112 of the in-vehicle device 1 is caused to run in the foreground, and the navigation function to be utilized by a user is switched to the navigation APP 112 of the in-vehicle device 1, which is caused to execute the destination setting operation.

Thus, in forms of the present disclosure, when the navigation server 4 is not available for the navigation client APP 212 of the mobile device 2, complicated operations such as the following are unnecessary: after a user starts a destination processing of the navigation client APP 212 of the mobile device 2, the user is informed of a failure in acquisition of setting of a destination or a guidance route to the destination from the navigation server 4 due to unavailability of the navigation server 4, and the user switches the application running in the foreground to the navigation APP 112, which is caused to execute the destination setting operation.

It is therefore intended that the foregoing detailed description be regarded as illustrative rather than limiting, and that it be understood that it is the following claims, including all equivalents, that are intended to define the spirit and scope of this invention.

What is claimed is:

1. A navigation system comprising:
    an in-vehicle device mounted in an automobile;
    a mobile device configured to connect to the in-vehicle device; and
    a navigation server configured to transmit map data and a route to a destination requested from the mobile device to the mobile device via wireless communication,
    the in-vehicle device including:
        a display device,
        an input device,
        a map data storage configured to store map data,
        an in-vehicle storage device; and
        an in-vehicle device processor configured to execute instructions stored in the in-vehicle storage device and to act as:
            a current position calculation unit configured to calculate a current position of the automobile,
            a navigation unit configured to perform:
                a destination setting operation to receive setting of a destination from a user via the input device when a first mode is set as an operation mode of the in-vehicle device,
                a guidance route setting operation to set a guidance route to be a route to the destination received in the destination setting operation, and
                a navigation screen display operation to display a navigation screen on the display device, the navigation screen showing the current position of the automobile and the guidance route on a map represented by the map data stored in the map data storage, and a navigation switch controller, the mobile device including:

a mobile device storage unit; and a mobile device processor configured to execute instructions stored in the mobile device storage unit and to act as:

a current position calculation unit configured to calculate a current position of the mobile device, a navigation client unit configured to perform:

a destination reception operation to receive setting of a destination from a user via the input device of the in-vehicle device when a second mode is set as the operation mode in a state in which the mobile device is connected to the in-vehicle device, a guidance route acquisition operation to request a route to the destination received in the destination reception operation from the navigation server system, and thereby to obtain the route from the navigation server system to set a guidance route, and a route guidance screen display operation to obtain map data from the navigation server system, to transfer a route guidance screen to the in-vehicle device, which is caused to display the route guidance screen on the display device, the route guidance screen showing the current position of the mobile device and the guidance route on a map represented by the obtained map data, and a state management controller configured to detect a state indicating whether or not the navigation client unit is connectable to the navigation server, wherein when the first mode is set as the operation mode in a state in which the mobile device is connected to the in-vehicle device and an instruction to start a setting operation for a destination is provided by a user, the in-vehicle device processor acting as the navigation switch controller is configured to cause the in-vehicle device processor acting as the navigation unit of the in-vehicle device to perform the destination setting operation, wherein when the second mode is set as the operation mode in a state in which the mobile device is connected to the in-vehicle device and an instruction to start the setting operation for a destination is provided by a user, in the case where a state detected by the mobile device controller acting as the state management controller of the mobile device indicates that the navigation client unit is connectable to the navigation server, the in-vehicle device processor acting as the navigation switch controller is configured to cause the mobile device processor acting as the navigation client unit of the mobile device to perform the destination reception operation, and wherein when the second mode is set as the operation mode in a state in which the mobile device is connected to the in-vehicle device and an instruction to start the setting operation for a destination is provided by a user, in the case where a state detected by the mobile device controller acting as the state management controller of the mobile device indicates that the navigation client unit is not connectable to the navigation server, the in-vehicle device processor acting as the navigation switch controller is configured to perform a navigation switching operation to switch the operation mode to the first mode and to cause the in-vehicle processor acting as the navigation unit of the in-vehicle device to perform the destination setting operation.

2. The navigation system according to claim 1, wherein after the navigation switching operation is performed, when the state detected by the mobile device controller acting as the state management controller of the mobile device changes to a state indicating that the mobile device processor acting as the navigation client unit is connectable to the navigation server, the in-vehicle device processor acting as the navigation switch controller is configured to set the destination set in the navigation unit to a destination of the navigation client unit, and to change the operation mode back to the second mode.

3. The navigation device according to claim 2, wherein as the operation mode, the in-vehicle device has one or more modes different from the first mode and the second mode, when neither the first mode nor the second mode is set as the operation mode in a state in which the mobile device is connected to the in-vehicle device and an instruction to start a setting operation for a destination is provided by a user, in the case where an operation mode set most recently out of the first mode and the second mode is the first mode, the in-vehicle device processor acting as the navigation switch controller is configured to switch the operation mode to the first mode, and to cause the in-vehicle processor acting as the navigation unit of the in-vehicle device to perform the destination setting operation, when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the state detected by the mobile device controller acting as the state management controller of the mobile device indicates that the mobile device processor acting as the navigation client unit is connectable to the navigation server, the in-vehicle device processor acting as the navigation switch controller is configured to switch the operation mode to the second mode, and to cause the mobile device processor acting as the navigation client unit of the mobile device to perform the destination reception operation, and when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the state detected by the mobile device controller acting as the state management controller of the mobile device indicates that the navigation client unit is not connectable to the navigation server, the in-vehicle device processor acting as the navigation switch controller is configured to switch the operation mode to the first mode, and to cause the in-vehicle processor acting as the navigation unit of the in-vehicle device to perform the destination setting operation.

4. The navigation system according to claim 3, wherein the state indicating whether or not the mobile device processor acting as the navigation client unit is connectable to the navigation server is a state indicating whether or not the mobile device is capable of the wireless communication, a state in which the mobile device is capable of the wireless communication indicates that the navigation client unit is connectable to the navigation server, and a state in which the mobile device is not capable of the wireless communication indicates that the navigation client unit is not connectable to the navigation server.

5. The navigation system according to claim 1,
wherein the wireless communication is mobile communication that is performed via a mobile communication network, and
the state indicating whether or not the mobile device processor acting as the navigation client unit is connectable to the navigation server is a state indicating whether the mobile device is located within a communication range or out of the communication range of the mobile communication network, a state in which the mobile device is located within the communication range of the mobile communication network indicates that the navigation client unit is connectable to the navigation server, and a state in which the mobile device is located out of the communication range of the mobile communication network indicates that the navigation client unit is not connectable to the navigation server.

6. The navigation system according to claim 1, wherein the state indicating whether or not the mobile device processor acting as the navigation client unit is connectable to the navigation server is a state indicating whether the navigation client unit of the mobile device and the navigation server are in online state or offline state, a state in which the navigation client unit of the mobile device and the navigation server are in online state indicates that the navigation client unit is connectable to the navigation server, and a state in which the navigation client unit of the mobile device and the navigation server are in offline state indicates that the navigation client unit is not connectable to the navigation server.

7. An in-vehicle device configured to be mounted in an automobile and configured to be connected to a mobile device including a mobile device processor configured to act as a navigation client unit that receives setting of a destination, connects to a navigation server via wireless communication, obtains from the navigation server a route to the destination in the received setting as a guidance route, and outputs a route guidance screen showing a current position of the mobile device and the guidance route on a map, the in-vehicle device comprising:
  a display device;
  an input device;
  a map data storage that stores map data;
  an in-vehicle storage device; and
  an in-vehicle device processor configured to execute instructions stored in the in-vehicle storage device and to act as:
    a current position calculation unit configured to calculate a current position of the automobile;
    a navigation unit configured to perform a destination setting operation to receive setting of a destination from a user via the input device when a first mode is set as an operation mode of the in-vehicle device, a guidance route setting operation to set a guidance route to be a route to the destination received in the destination setting operation, and a navigation screen display operation to display a navigation screen on the display device, the navigation screen showing the current position of the automobile and the guidance route on a map represented by the map data stored in the map data storage;
    an external user interface providing unit configured to provide a user interface using the input device and the display device, as a user interface of the navigation client unit of the mobile device when a second mode is set as the operation mode in a state in which the mobile device is connected to the in-vehicle device; and
    a navigation switch controller,
  wherein when the first mode is set as the operation mode in a state in which the mobile device is connected to the in-vehicle device and an instruction to start a setting operation for a destination is provided by a user, the in-vehicle device processor acting as the navigation switch controller is configured to cause the navigation unit of the in-vehicle device to perform the destination setting operation,
  when the second mode is set as the operation mode in a state in which the mobile device is connected to the in-vehicle device and an instruction to start the setting operation for a destination is provided by a user, in the case where the mobile device processor acting as the navigation client unit of the mobile device is connectable to the navigation server, the in-vehicle device processor acting as the navigation switch controller is configured to cause the mobile device processor acting as the navigation client unit of the mobile device to perform reception of setting of a destination from a user via the input device, and
  when the second mode is set as the operation mode in a state in which the mobile device is connected to the in-vehicle device and an instruction to start the setting operation for a destination is provided by a user, in the case where the mobile device processor acting as the navigation client unit of the mobile device is not connectable to the navigation server, the in-vehicle device processor acting as the navigation switch controller is configured to perform a navigation switching operation to switch the operation mode to the first mode and to cause the navigation unit of the in-vehicle device to perform the destination setting operation.

8. The in-vehicle device according to claim 7, wherein after the navigation switching operation is performed, when the mobile device processor acting as the navigation client unit of the mobile device is connectable to the navigation server, the in-vehicle device processor acting as the navigation switch controller is configured to set the destination set in the navigation unit to a destination of the navigation client unit, and to change the operation mode back to the second mode.

9. The in-vehicle device according to claim 8,
wherein as the operation mode, the in-vehicle device has one or more modes different from the first mode and the second mode,
when neither the first mode nor the second mode is set as the operation mode in a state in which the mobile device is connected to the in-vehicle device and an instruction to start a setting operation for a destination is provided by a user, in the case where an operation mode set most recently out of the first mode and the second mode is the first mode, the in-vehicle processor acting as the navigation switch controller is configured to switch the operation mode to the first mode, and to cause the navigation unit of the in-vehicle device to perform the destination setting operation, when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the mobile device processor acting as the navigation client unit of the mobile device is connectable to the navigation server, the in-vehicle device processor acting as the navigation switch controller is configured to switch the operation mode to the second mode, and to cause the navigation client unit of the mobile device to perform reception of setting of a destination from a user via the input device, and when neither the first mode nor the second mode is set as the operation mode in a state in which the mobile device is connected to the in-vehicle device and an instruction to start the setting operation for a destination is provided by a user, in the case where an operation mode set most recently out of the first mode and the second mode is the second mode and the mobile device processor acting as the navigation client unit of the mobile device is not connectable to the navigation server, the in-vehicle device processor acting as the navigation switch controller is configured to switch the operation mode to the first mode, and to cause the navigation unit of the in-vehicle device to perform the destination setting operation.

10. The in-vehicle device according to claim 9, wherein the in-vehicle device processor acting as the navigation switcher, when the mobile device is in a state that allows the wireless communication, is configured to identify that the mobile device processor acting as the navigation client unit is connectable to the navigation server, and when the mobile device is in a state that does not allow the wireless communication, to identify that the mobile device processor acting as the navigation client unit is not connectable to the navigation server.

11. The in-vehicle device according to claim 9,
wherein the wireless communication is mobile communication that is performed via a mobile communication network, and
the in-vehicle device processor acting as the navigation switch controller, when the mobile device is within a communication range of the mobile communication network, is configured to identify that the mobile device processor acting as the navigation client unit is connectable to the navigation server, and when the mobile device is out of the communication range of the mobile communication network, to identify that the navigation client unit is not connectable to the navigation server.

12. The in-vehicle device according to claim 7, wherein the in-vehicle device processor acting as the navigation switch controller, when the mobile device processor acting as the navigation client unit of the mobile device and the navigation server are in online state, is configured to identify that the navigation client unit is connectable to the navigation server, and when the navigation client unit of the mobile device and the navigation server are in offline state, to identify that the navigation client unit is not connectable to the navigation server.

* * * * *